(12) United States Patent
Kanayama et al.

(10) Patent No.: US 7,702,722 B2
(45) Date of Patent: Apr. 20, 2010

(54) COMBINATION EQUIPMENT SELECTION SYSTEM USING NETWORK

(75) Inventors: Masatoshi Kanayama, Nagano (JP); Akira Katou, Tokyo (JP); Noboru Ishizeki, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 228 days.

(21) Appl. No.: 10/529,160

(22) PCT Filed: Sep. 24, 2002

(86) PCT No.: PCT/JP02/09761

§ 371 (c)(1),
(2), (4) Date: Apr. 28, 2005

(87) PCT Pub. No.: WO2004/029845

PCT Pub. Date: Apr. 8, 2004

(65) Prior Publication Data

US 2006/0075016 A1    Apr. 6, 2006

(51) Int. Cl.
G06F 15/16  (2006.01)
(52) U.S. Cl. .................................................. 709/203
(58) Field of Classification Search ................ 709/203, 709/218, 219; 715/700; 705/26, 27
See application file for complete search history.

(56) References Cited

U.S. PATENT DOCUMENTS 5,825,651 A * 10/1998 Gupta et al. ................ 700/103
6,032,150 A    2/2000 Nguyen
7,111,019 B1 * 9/2006 Nishizawa et al. .......... 707/201
2001/0051893 A1 12/2001 Hannai et al. ................ 705/26

(Continued)

FOREIGN PATENT DOCUMENTS

EP    1 071 017    1/2001

(Continued)

OTHER PUBLICATIONS

"The "Healthy Client"; new client/server computing technology revolutionizing the management of information-driven systems", Savino S. P. et al., Engineering and Technology Management, Oct. 11, 1998, pp. 100-105, (English text).

(Continued)

Primary Examiner—Saleh Najjar
Assistant Examiner—Jason Recek
(74) Attorney, Agent, or Firm—Rankin, Hill & Clark LLP

(57) ABSTRACT

A user terminal device stores user information in a memory, and stores constant data in another memory. The user terminal device selects one or more other equipment to be combined suitably for use with the service equipment, based on the model information and operational conditions of the service equipment as well as the stored constant data. Then, the user terminal device transmits the user information and the selection information to the host computer, and requests display permission from the host computer for displaying the selection information onto the display section. The selection information is displayed on the display section only when the display permission is obtained from the host computer. Thus, workload on the host computer end may be reduced. In addition, the host computer does not fail to obtain the user information.

3 Claims, 11 Drawing Sheets

U.S. PATENT DOCUMENTS

| | | | |
|---|---|---|---|
| 2003/0014329 A1* | 1/2003 | Weisman et al. | 705/26 |
| 2003/0088471 A1* | 5/2003 | Tanigaki et al. | 705/20 |
| 2003/0110443 A1* | 6/2003 | Yankovich et al. | 715/501.1 |
| 2003/0212610 A1* | 11/2003 | Duffy et al. | 705/26 |
| 2006/0085282 A1* | 4/2006 | Hanai et al. | 705/26 |

FOREIGN PATENT DOCUMENTS

| | | |
|---|---|---|
| JP | 2002-024562 | 1/2002 |
| JP | 2002-041875 | 2/2002 |
| JP | 2002-215929 | 8/2002 |
| KR | 2000-0024371 | 5/2000 |
| WO | 00/42492 | 7/2000 |
| WO | 02/057983 | 7/2002 |

OTHER PUBLICATIONS

"JFS: a secure distributed file system for network computers", o'connell M. et al., Euromicro Conference, Sep. 8, 1999, pp. 450-457, (English text).

An innovative internet architecture for application service providors. Furht B. et al., Systems Sciences, Proceedings of the 33RD Annual Hawaii Internati Onal Conference on Jan 4-7, 2000,pp. 2135-2144, (English text).

* cited by examiner

COMBINATION EQUIPMENT SELECTION SYSTEM USING NETWORK

TECHNICAL FIELD

The present invention relates to a combined equipment selection system using a communication network, for selecting an equipment which can be combined with another equipment a user wishes to use.

BACKGROUND ART

The combination and specification of various equipments have been conventionally determined by a computer system using a communication network. For example, the Japanese Patent Application Laid-open Publication No. 24562/2000 discloses a technology by which a host computer performs operations and transmits the result to a user terminal device when a specification is determined between a registered user and a supplier or dealer. The Japanese Patent Application Laid-open Publication no. 41875/2000 discloses a technology by which a host computer obtains user information by allowing a user to carry out cost estimation of order-made house building at a user terminal device using a pre-distributed program and to transmit the estimation to the host computer.

With the arrangement according to the former technology, as the number of users increases, the workload on the host computer side becomes heavier, which lead to prolonged time until the user obtains the result. With the arrangement according to the latter technology, since the user can confirm the cost estimation without transmitting the estimation result to the host computer, there is a problem that the host computer cannot securely obtain the user information. In addition, with the latter technology, there is another problem that variable data are not provided to the user.

Accordingly, an object of the present invention is to provide a combined equipment selection system which is capable of securely obtaining the user information while reducing the workload on the host computer.

Another object of the present invention is to provide a combined equipment selection system which is capable of providing the user with the selection information based on the recent information.

Still another object of the present invention is to provide a program which is executed on a user terminal device in the combined equipment selection system which is capable of securely obtaining the user information while reducing the workload on the host computer.

Yet another object of the present invention is to provide a program which is executed on a user terminal device in the combined equipment selection system which is capable of providing the user with the selection information based on the recent information.

DISCLOSURE OF THE INVENTION

A combined equipment selection system according to the present invention comprises a plurality of user terminal devices each having an operation section and a display section and connected to a communication network, and a host computer connected to the communication network for communicating with the plurality of user terminal devices and obtaining user information from the user terminal devices. The combined equipment selection system receives service equipment information on a service equipment which a user wishes to use, entered by the user from the operation section of the user terminal device, selects one or more other combined equipment which is different from the service equipment and is suitable for being combined with the service equipment based on the service equipment information, and displays selection information on the combined equipment onto the display section of the user terminal device.

In the present invention, each of the plurality of user terminal devices includes a user information memory means, a constant data memory means, a combined equipment selection means, and a selection information display control means. The user information memory means stores the user information entered from the operation section. The constant data memory means stores constant data on the service equipment and one or more other combined equipment. The combined equipment selection means carries out a selection operation which selects one or more other combined equipment which is different from the service equipment and is suitable for being combined with the service equipment, based on model information and operational conditions of the service equipment entered from the operation section, and the constant data stored in the constant data memory means. The selection information display control means requests a display permission from the host computer for displaying the selection information onto the display section on condition that the user information and the selection information selected by the combined equipment selection means are transmitted to the host computer, and displays the selection information onto the display section only when the display permission is obtained from the host computer.

The host computer includes an information memory means for storing the user information and the selection information obtained from the user terminal device, and a display permission transmission means for transmitting the display permission to the user terminal device when the user information and the selection information are entered from the user terminal device.

In the system according to the present invention, the selection operation is carried out on the user terminal device. Therefore, even when the number of users increases, the workload on the host computer side will not become extremely heavy, and the required time until the result is obtained will not be prolonged. In the present invention, in order to enable the selection information to be displayed onto the display section of the user terminal device, a display permission must be obtained by transmitting the user information and selection information to the host computer. Consequently, each time the user is allowed to display the selection information onto the display section, the system can securely obtain the information from the user.

Depending upon the service equipment, the specification may be modified in some occasions. In order to allow for such specification modifications, the user terminal device may be provided with a variable data memory means for storing variable data necessary for selecting the combined equipment, transmitted from the host computer via the communication network, and the host computer is also provided with such a variable data memory means. The variable data may be read in at the same time with the reading of a display permission after the user information and selection information have been transmitted to the host computer. In this case, after the variable data are read in, the selection information, which is obtained by causing the combined equipment selection means to be carried out again, should be displayed onto the display section. The user terminal device may alternatively be provided with an update means for receiving the variable data from the host computer on condition that the user information is transmitted to the host computer in advance, and updating the variable data stored in the variable data memory means. In this case, the display permission transmission means of the host computer should be so constructed as to transmit updated variable data to the user terminal device when only the user information is entered from the user terminal device, and to transmit the display permission to the user terminal device when the user information and selection information are entered from the user terminal device.

In order to implement the present invention, a program is executed on a plurality of user terminal devices in the combined equipment selection system. Such a program is so constructed as to perform a user information memory function for storing the user information entered from the operation section, a constant data memory function for storing constant data on the service equipment and one or more other combined equipment, a combined equipment selection function for carrying out a selection operation which selects one or more other combined equipment which is different from the service equipment and is suitable for being combined with the service equipment, based on model information and operational conditions of the service equipment entered from the operation section as well as the constant data, and a selection information display function for requesting a display permission from the host computer for displaying the selection information onto the display section on condition that the user information and the selection information are transmitted to the host computer, and displaying the selection information onto the display section only when the display permission is obtained from the host computer.

Another program to be executed on a plurality of user terminal devices is so constructed as to perform a user information memory function for storing the user information entered from the operation section, a constant data memory function for storing constant data on the service equipment and one or more other combined equipment, a variable data memory function for storing variable data out of data necessary for selecting the combined equipment, transmitted from the host computer via the communication network, a combined equipment selection function for carrying out a selection operation which selects one or more other combined equipment which is different from the service equipment and is suitable for being combined with the service equipment, based on model information and operational conditions of the service equipment entered from the operation section as well as the constant data and variable data, and a selection information display control function for requesting a display permission from the host computer for displaying the selection information onto the display section on condition that the user information and selection information are transmitted to the host computer, confirming whether or not the variable data are updated when the display permission is obtained from the host computer, and displaying the selection information onto the display section if the variable data are not updated, or displaying the selection information onto the display section after carrying out again the combined equipment selection function if the variable data are updated.

Still another program to be executed on a plurality of user terminal devices is so constructed as to perform a user information memory function for storing the user information entered from the operation section, a constant data memory function for storing constant data on the service equipment and one or more other combined equipment, a variable data memory function for storing variable data out of data necessary for selecting the combined equipment, transmitted from the host computer via the communication network, an update function for receiving said variable data from the host computer on condition that the user information is transmitted to the host computer, and updating the variable data, a combined equipment selection function for carrying out a selection operation which selects one or more other combined equipment which is different from the service equipment and is suitable for being combined with the service equipment, based on model information and operational conditions of the service equipment entered from the operation section as well as the constant data and the variable data, and a selection information display control function for requesting a display permission from the host computer for displaying the selection information onto the display section on condition that the selection information is transmitted to the host computer, and displaying the selection information onto the display section when the display permission is obtained from the host computer.

BEST MODE FOR IMPLEMENTING THE INVENTION

Figure 1:
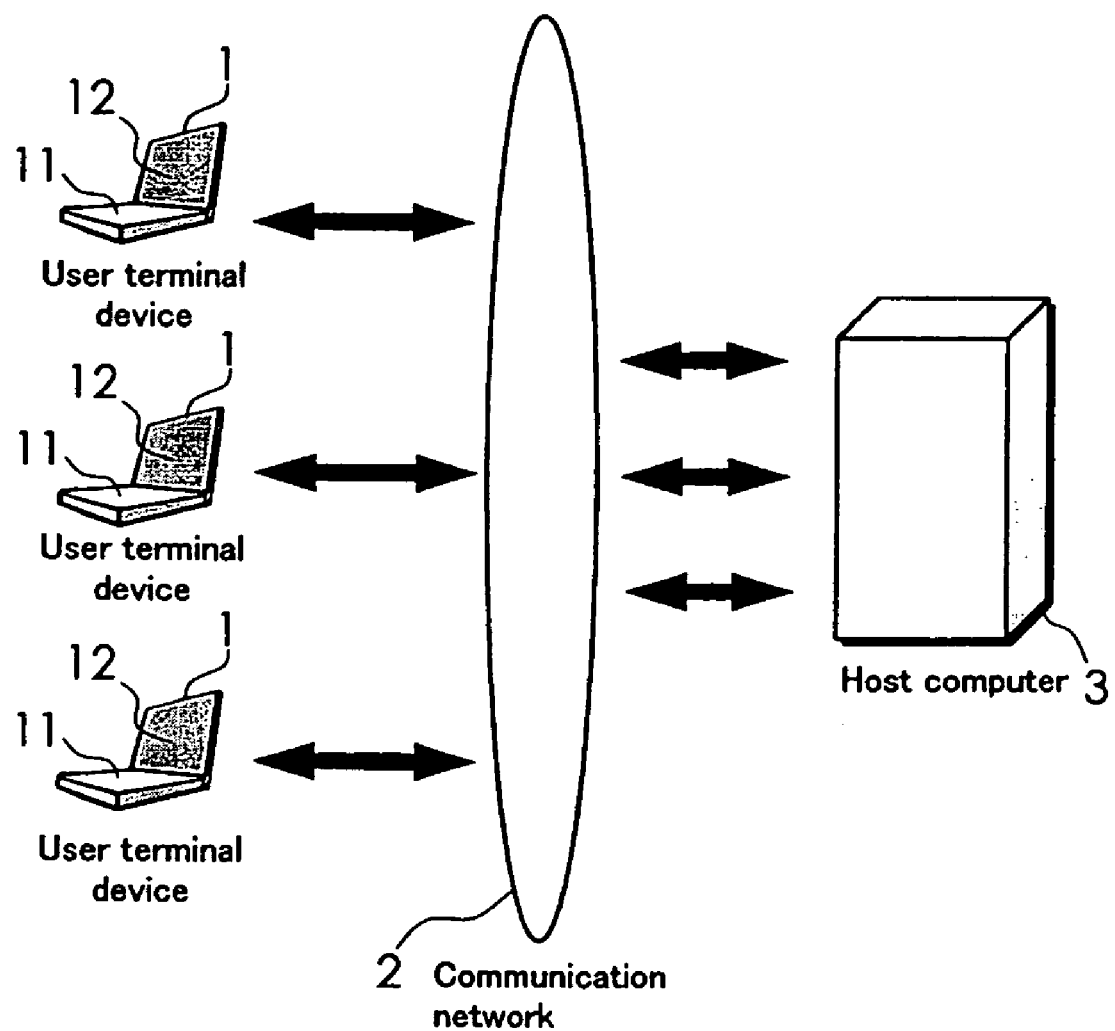
FIG. 1 shows an outline of a combined equipment selection system according to the present invention.

Now, some embodiments of the present invention will be described in detail with reference to the accompanying drawings. FIG. 1 shows an outline of a combined equipment selection system according to the present invention. This combined equipment selection system comprises a plurality of user terminal devices 1 each having an operation section 11 and a display section 12 and connected to a communication network and a host computer 3 connected to the communication network 2 for communicating with the plurality of user terminal devices 1 and obtaining user information from the user terminal devices 1. The user terminal device 1 is typically a personal computer, and a specified program is installed on that computer. The communication network 2 is a so-called global communication network such as the Internet.

The host computer 3 is managed by a person or a company which is operating this system.

Figure 2:
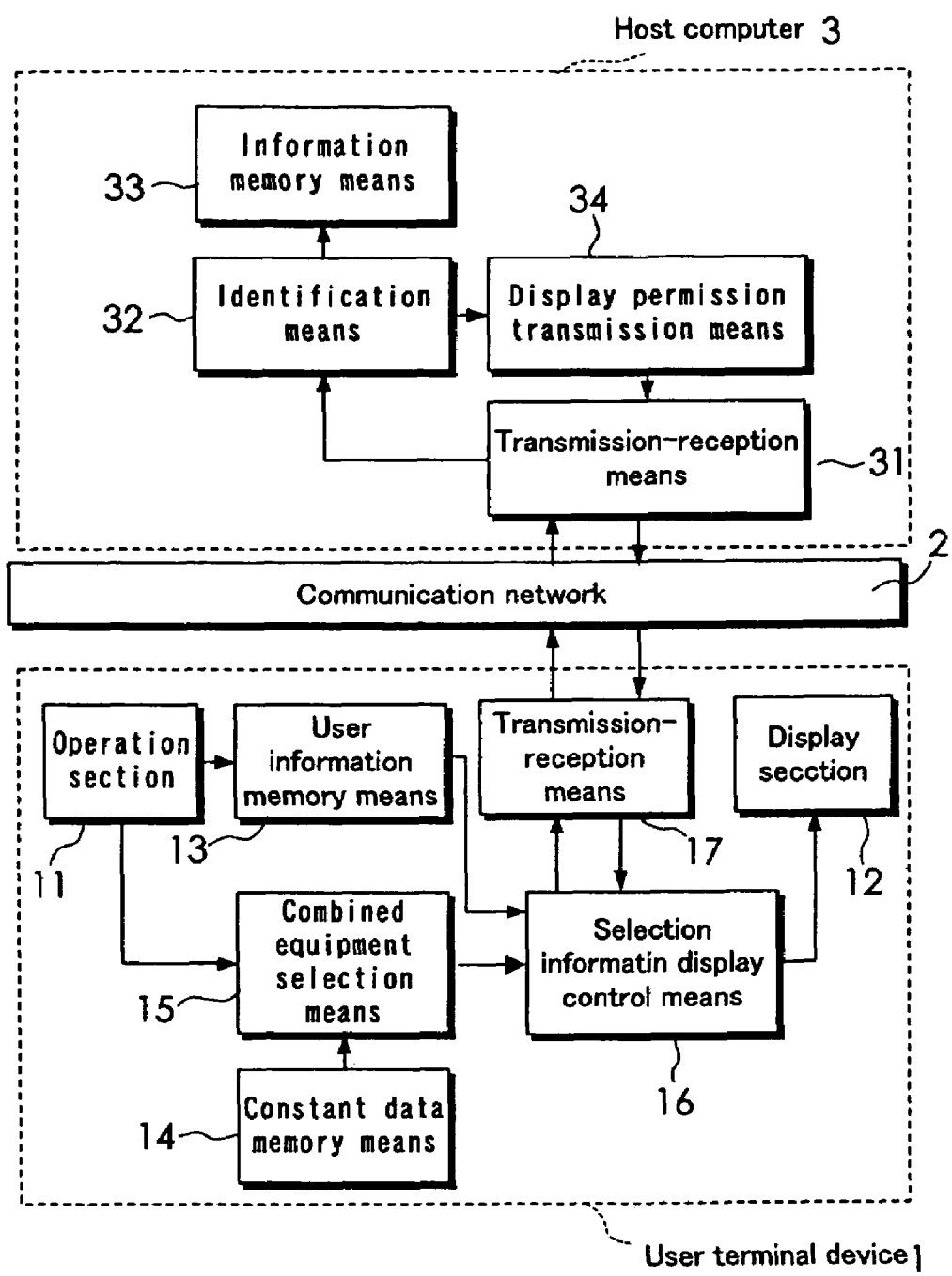
FIG. 2 is a block diagram showing a configuration of an embodiment of the present invention which selects a motor in a combined equipment selection system according to the present invention.

FIG. 2 is a block diagram showing a configuration of an embodiment of the present invention which selects a motor in a combined equipment selection system according to the present invention. This combined equipment selection system receives service equipment information on a service equipment which a user wishes to use, entered by the user from the operation section 11 of the user terminal device 1, selects one or more other combined equipment which is different from the service equipment and is suitable for being combined with the service equipment based on the service equipment information, and displays selection information on the combined equipment onto the display section 12 of the user terminal device 1.

Figure 3:
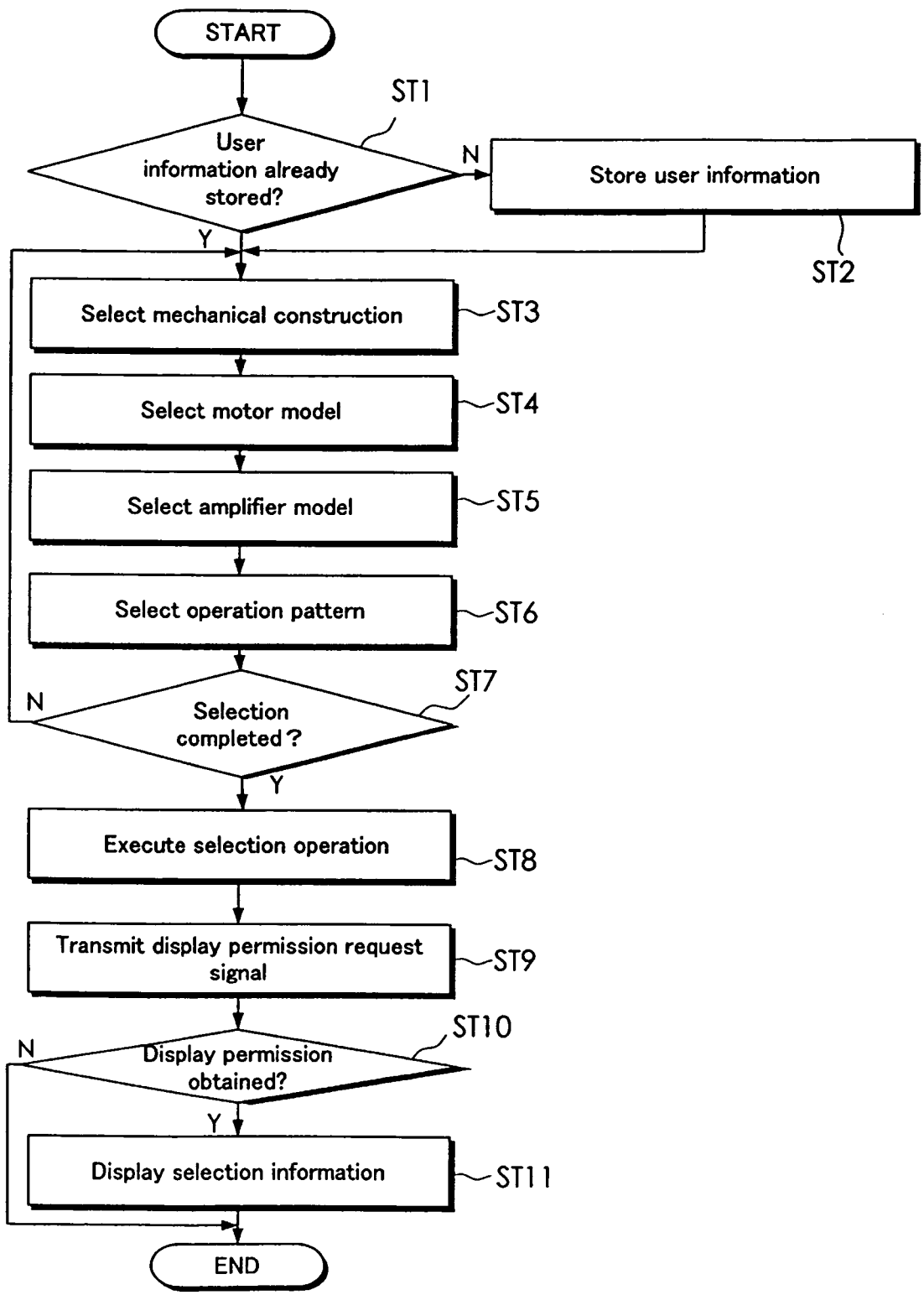
FIG. 3 is a flowchart showing a software algorithm to be used in implementing the present invention, being installed on a user terminal device in the embodiment of FIG. 2.
Figure 4:
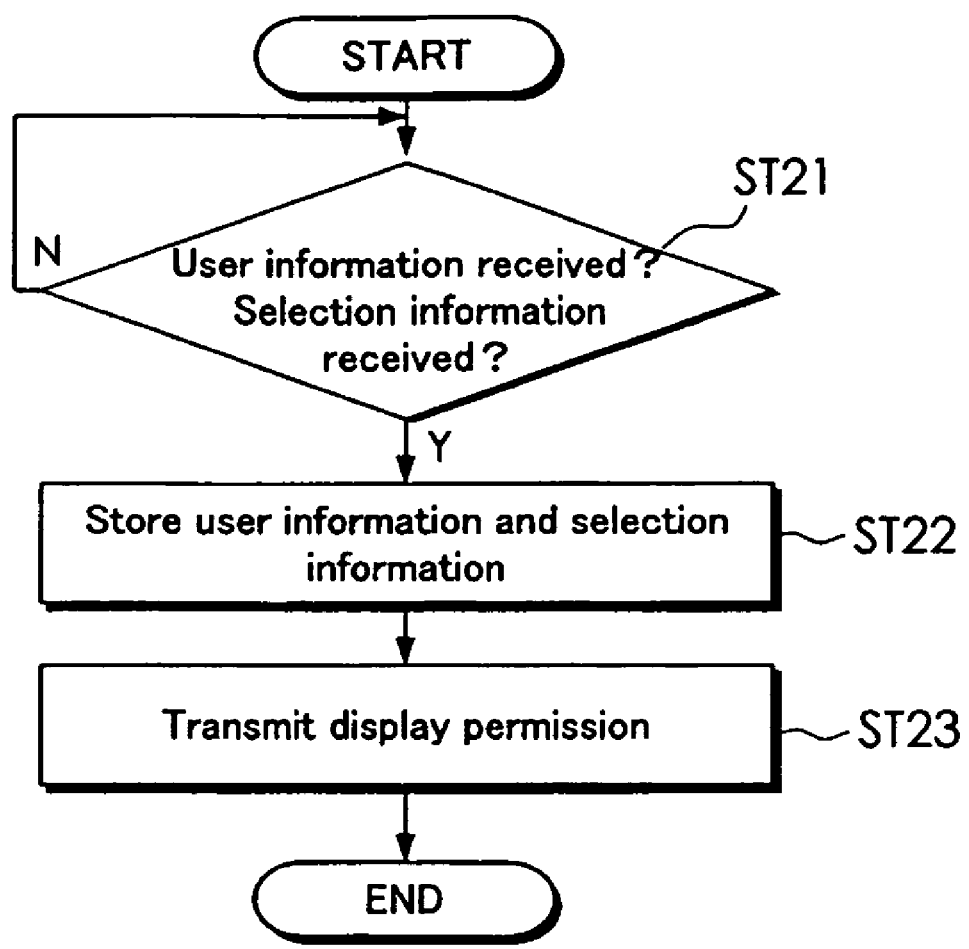
FIG. 4 is a flowchart showing a software algorithm to be used in implementing the present invention, being installed on a host computer in the embodiment of FIG. 2.

FIG. 3 is a flowchart showing a software (program) algorithm to be used in implementing the present invention, being installed on the user terminal device 1 in the above-mentioned embodiment. FIG. 4 is a flowchart showing a software (program) algorithm to be used in implementing the present invention, being installed on the host computer 3 in the above-mentioned embodiment. Now, with reference to these figures, the embodiment of FIG. 1 will be described below.

In this embodiment, each of the plurality of user terminal devices 1 includes a user information memory means 13, a constant data memory means 14, a combined equipment selection means 15, a selection information display control means 16, and a transmission-reception means 17. The user information memory means 13 stores the user information entered from the operation section 11 (at Steps ST1 and ST2). The user information typically includes an email address, name, postal address and telephone number of the user, and other information available for identifying the user. Once the user information is stored in the user information memory means 13, the information is retained unless it is updated.

The constant data memory means 14 stores constant data on the service equipment and one or more other combined equipment. Suppose, for example, that a target combined equipment is a motor. The service equipment typically includes an amplifier for driving the motor and mechanical constructional elements of the load. In this case, the constant data typically includes mechanical construction of the load, motor model, amplifier model, operation pattern, and selection criteria. The mechanical construction data are, for example, a horizontal construction type included in the mechanical construction and its data, a vertical construction type included in the mechanical construction and its data, and other auxiliary mechanism type included in the mechanical construction and its data. The motor model data are, for example, capacity, responsiveness, sensor type, existence of a brake, and gear type. The amplifier model data are, for example, model, performance and functionality, power source, and control type (positional, torque, or speed control). The operation pattern data are, for example, relationship between the time and the number of rotations of the motor axis, relationship between the time and load shift speed, relationship among the load shift amount, time, and load shift speed, and data for identifying various operation patterns (number of rotations, load speed, acceleration/deceleration speed, and shift distance). The selection criteria are values based on which selection calculation is determined as acceptable. For example, such values are the maximum number of rotations, load torque factor, acceleration torque factor, deceleration torque factor, execution torque factor, inertia ratio, and energy load factor.

The combined equipment selection means 15 carries out a selection operation which selects one or more other combined equipment which is different from the service equipment and is suitable for being combined with the service equipment, based on model information and operational conditions of the service equipment entered from the operation section 11 (at Steps ST3 through ST7), and the constant data stored in the constant data memory means 14. In this selection operation, the following information and conditions are entered from the operation section 11: information and conditions required for inertia calculation construction, information and conditions required for mass calculation, information and conditions required for deceleration ratio calculation, various constants (at Steps ST3 and ST4), and information and conditions required for determining the operation pattern (at Step ST6). In order to facilitate data entry from the operation section 11, a plurality of templates are predefined for entry of necessary data. Data entry should be done with a help of these templates displayed in order on the display section 12. The combined equipment selection means 15 carries out necessary calculations and selects an available motor, based on the entered data and constant data stored in the constant data memory means 14 (at Steps ST7 and ST8). The selection information determined by the selection operation typically includes the motor model and rated output.

Figure 5:
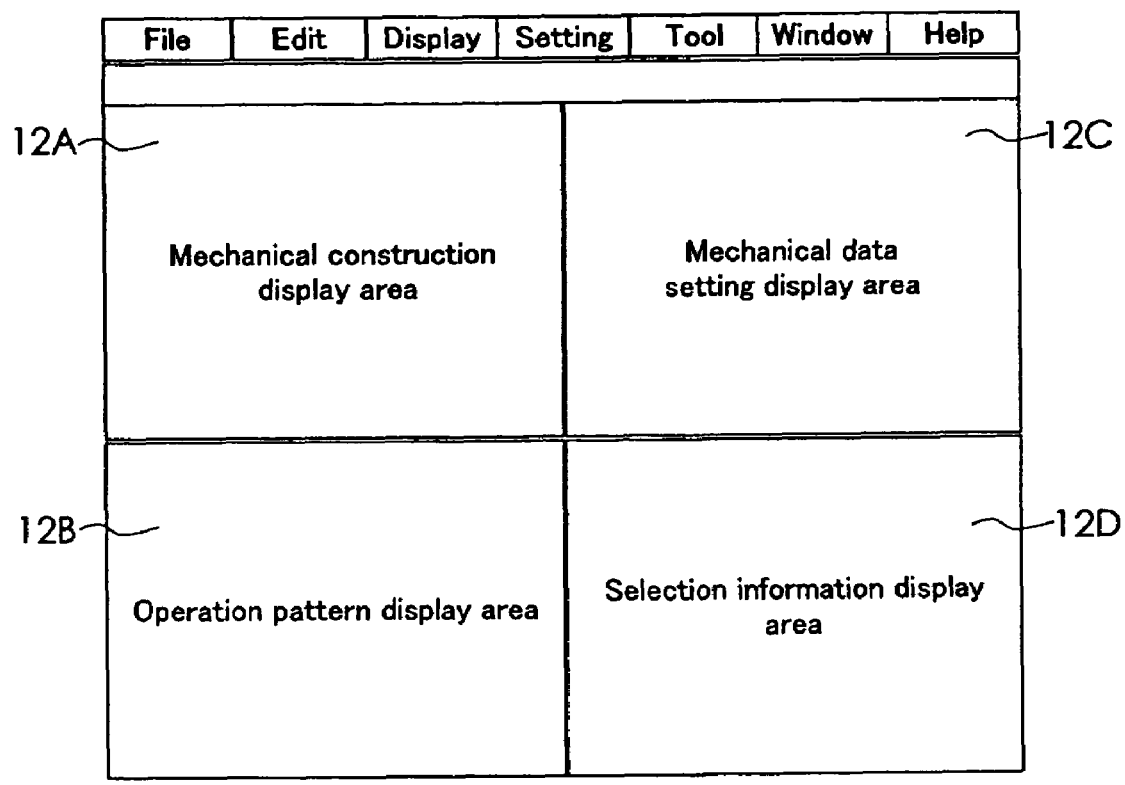
FIG. 5 shows an example of major items to be displayed on a display screen of the display section.

The selection information display control means 16 transmits to the host computer 3, via a transmission-reception means 17 and the communication network 2, a request signal for a display permission from the host computer 3 for displaying the selection information onto the display section 12 on condition that the user information and the selection information selected by the combined equipment selection means 15 are transmitted to the host computer 3 (at Step ST9). Then, as described later, the selection information display control means 16 displays the selection information onto the display section 12 (at Step ST11) when the display permission is obtained from the host computer 3 (at Step ST10). FIG. 5 shows an example of major items to be displayed on a display screen of the display section 12. The display screen is designed to display specified information, being divided into a mechanical construction display area 12A for displaying a mechanical construction to be driven by the selected motor, an operation pattern display area 12B for visually displaying the operation pattern, a mechanical data setting display area 12C for displaying the mechanical data settings, and a selection information display area 12D for displaying the selection result, namely, selection information.

The host computer 3 of FIG. 2 uses an identification means 32 to identify the user information obtained from the user terminal device 1 via the transmission-reception means 31, and the selection information (at Step 21 in FIG. 4). The identification means 32 determines if he/she is a registered or new user, based on the user information, and stores the user information in a new user memory means of an information memory means 33 if the user is new (at Step ST22). At the same time, the identification means 32 stores the transmitted selection information in a selection information memory means of the information memory means 33 (at Step T22). If the specially transmitted user information satisfies specified conditions, a display permission transmission means 34 is allowed to transmit a display permission signal (at Step ST23). In response to this, the display permission transmission means 34 transmits the display permission signal to a particular user terminal device 1 via the transmission-reception means 31 and the communication network (at Step ST23).

In the system according to this embodiment of the present invention, a selection operation is carried out on the user terminal device 1. Consequently, even when the number of users increases, the load on the host computer 3 side will not become extremely heavy. In addition, the time until the operation result is obtained will not be prolonged. In order that the selection information is displayed onto the display section 12 of the user terminal device 1, a display permission is absolutely necessary and should be obtained by transmitting the user information and selection information to the host computer With this arrangement, the system can securely obtain the information from the user each time the user displays the selection information on the display section. As a result, the system can accurately identify the user's needs and utilize the data on these needs in further development of the system.

Figure 6:
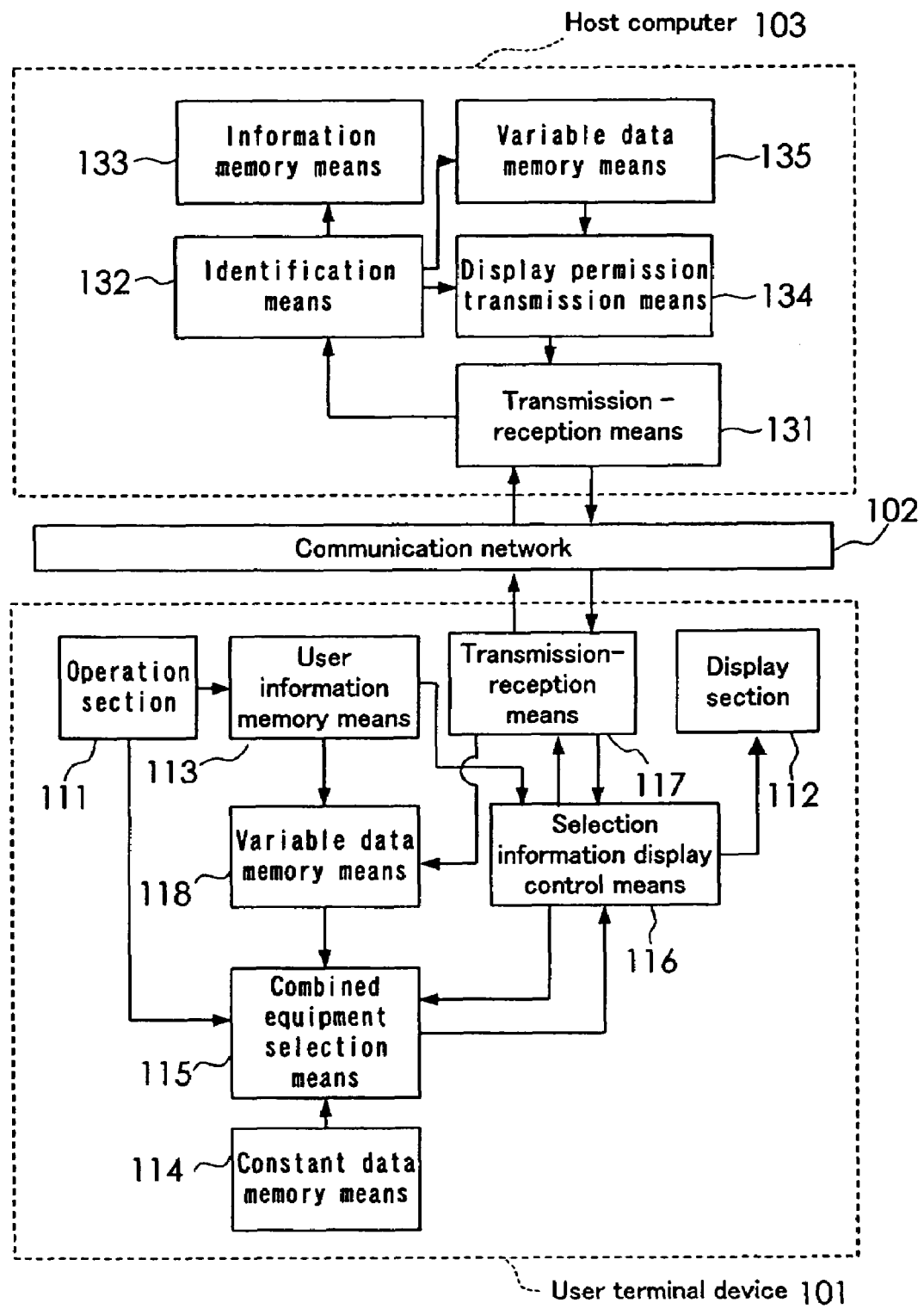
FIG. 6 is a block diagram showing a configuration of another embodiment of the present invention.
Figure 7:
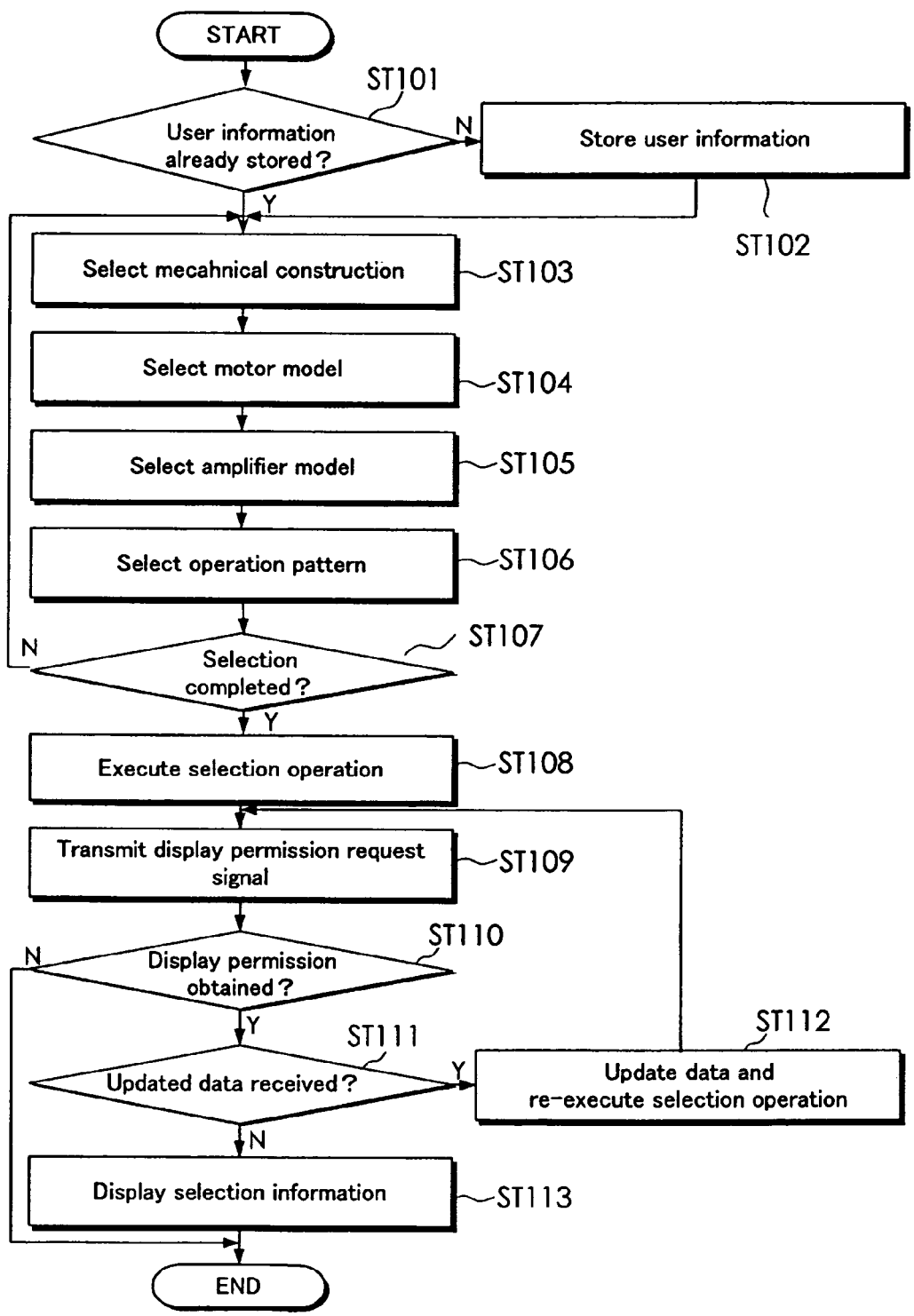
FIG. 7 is a flowchart showing a software algorithm to be used in implementing the present invention, being installed on a user terminal device in the embodiment of FIG. 6.
Figure 8:
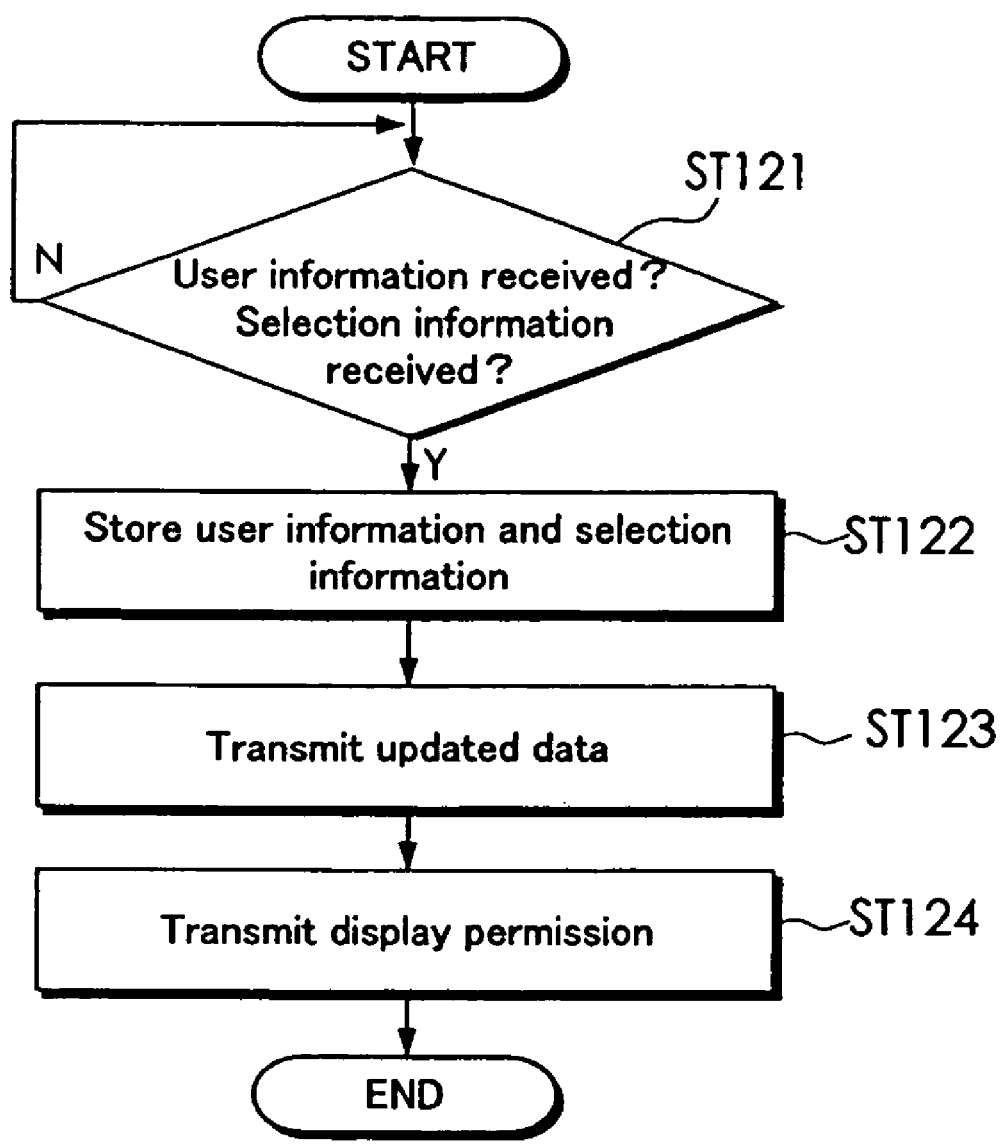
FIG. 8 is a flowchart showing a software algorithm to be used in implementing the present invention, being installed on a host computer in the embodiment of FIG. 6.

Depending upon the service equipment, the specifications (various data) may be modified. FIG. 6 is a block diagram showing a configuration of another embodiment of the present invention. This embodiment is intended for such modifications. Out of the elements composing the embodiment of FIG. 6, reference numerals, obtained by adding 100 to the reference numerals in FIG. 2, are given to the elements which are the same as those in FIG. 2. FIG. 7 is a flowchart showing a software (program) algorithm to be used in implementing the present invention, being installed on a user terminal device 101 in this embodiment. FIG. 8 is a flowchart showing a software (program) algorithm to be used in implementing the present invention, being installed on a host computer 103 in this embodiment. In comparing these flowcharts with those in FIGS. 3 and 4, Step ST111 for confirming reception of updated data and Step ST112 for updating data and re-executing the selection operation are added in FIG. 7, and Step ST123 for transmitting updated data is added in FIG. 8.

Each of the user terminal devices 101 includes a user information memory means 113 for storing the user information entered from the operation section 111, a constant data memory means 114 for storing constant data on the service equipment and one or more other combined equipment, a variable data memory means 118 for storing variable data, a combined equipment selection means 115, and a selection information display control means 116. The variable data memory means 118 stores variable data or updated data out of data necessary for selecting the combined equipment, transmitted from the host computer 103 via the communication network 102 and transmission-reception means 117 (at Step ST111). The combined equipment selection means 115 carries out a selection operation which selects one or more other combined equipment which is different from the service equipment and is suitable for being combined with the service equipment, based on model information and operational conditions of the service equipment entered from the operation section 111, the constant data stored in the constant data memory means 114 and the variable data stored in the variable data memory means 118 (at Steps ST103 through ST108 and Step ST112). The selection information display control means 116 requests a display permission from the host computer for displaying the selection information onto the display section 112 on condition that the user information and the selection information selected by the combined equipment selection means are transmitted to the host computer 103 via the transmission-reception means 117 and the communication network 102 (at Step ST109). The selection information display control means 116 confirms whether or not the variable data are updated when the display permission is obtained from the host computer 103, and displays the selection information onto the display section 112 if the variable data are not updated, or displays the selection information onto the display section 112 after causing the combined equipment selection means to carry out again the selection operation (at Step ST112) if the variable data are updated. In this embodiment, another request for a display permission should be made (at Steps ST112, ST109, and ST111). Then, the selection information based on the updated data is re-transmitted to the host computer 103. It is a matter of course to enable the selection information to be displayed onto the display section 112 after re-executing the combined equipment selection means without requesting for another display permission.

The host computer 103 uses the identification means 132 to identify the user information and the selection information obtained from the user terminal device 101, and stores them in the information memory means 133. Once the identification means 132 identifies the entered user information and selection information, the variable data memory means 135 transmits updated variable data to the display permission transmission means 134. In another viewpoint, the display permission transmission means 134 obtains updated variable data from the variable data memory means 135. The display permission transmission means 134 transmits updated variable data and a display permission to the user terminal device 101 on condition that the user information and selection information are entered from the user terminal device 101 (at Steps ST123 and ST124).

Figure 9:
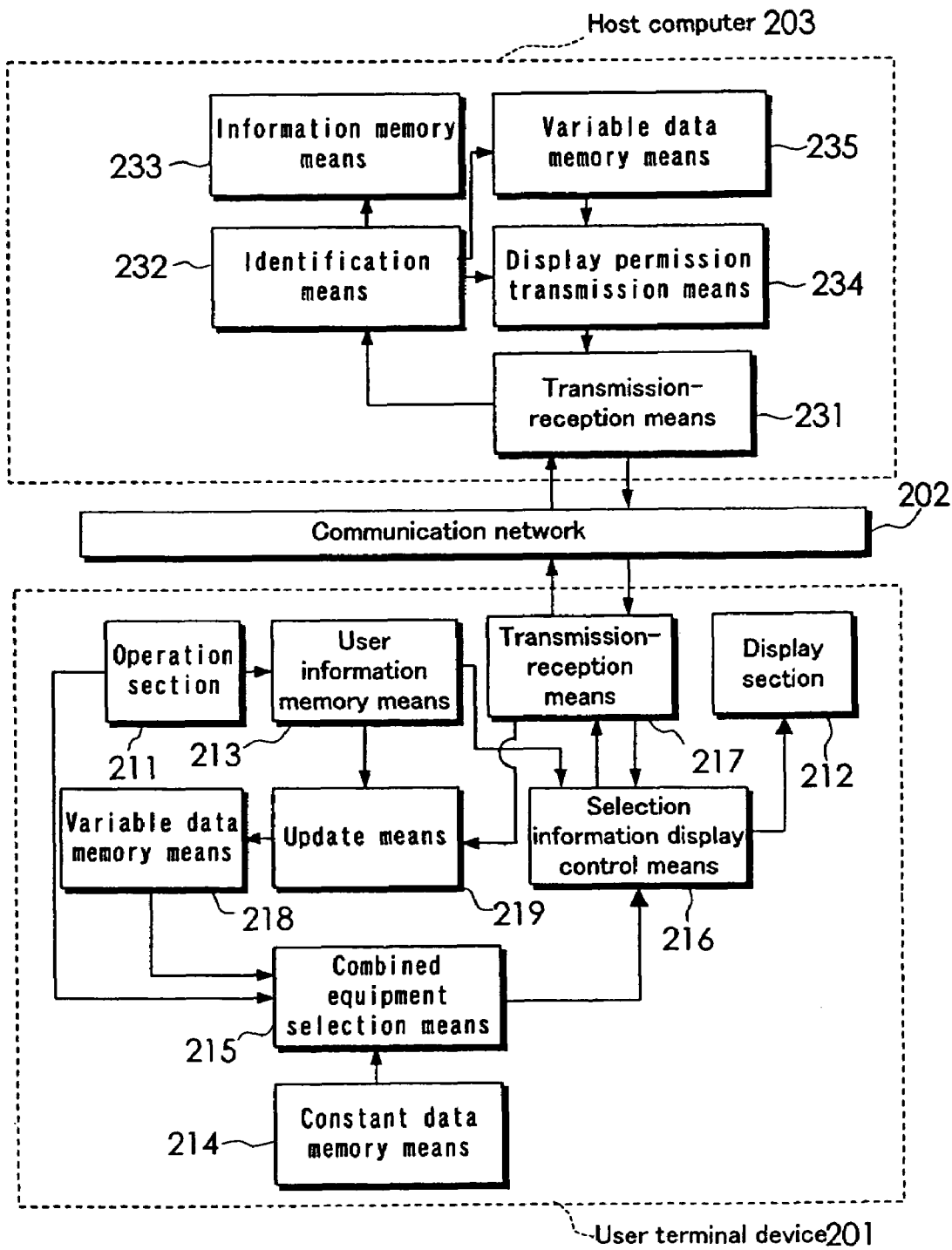
FIG. 9 is a block diagram showing a configuration of still another embodiment of the present invention.
Figure 10:
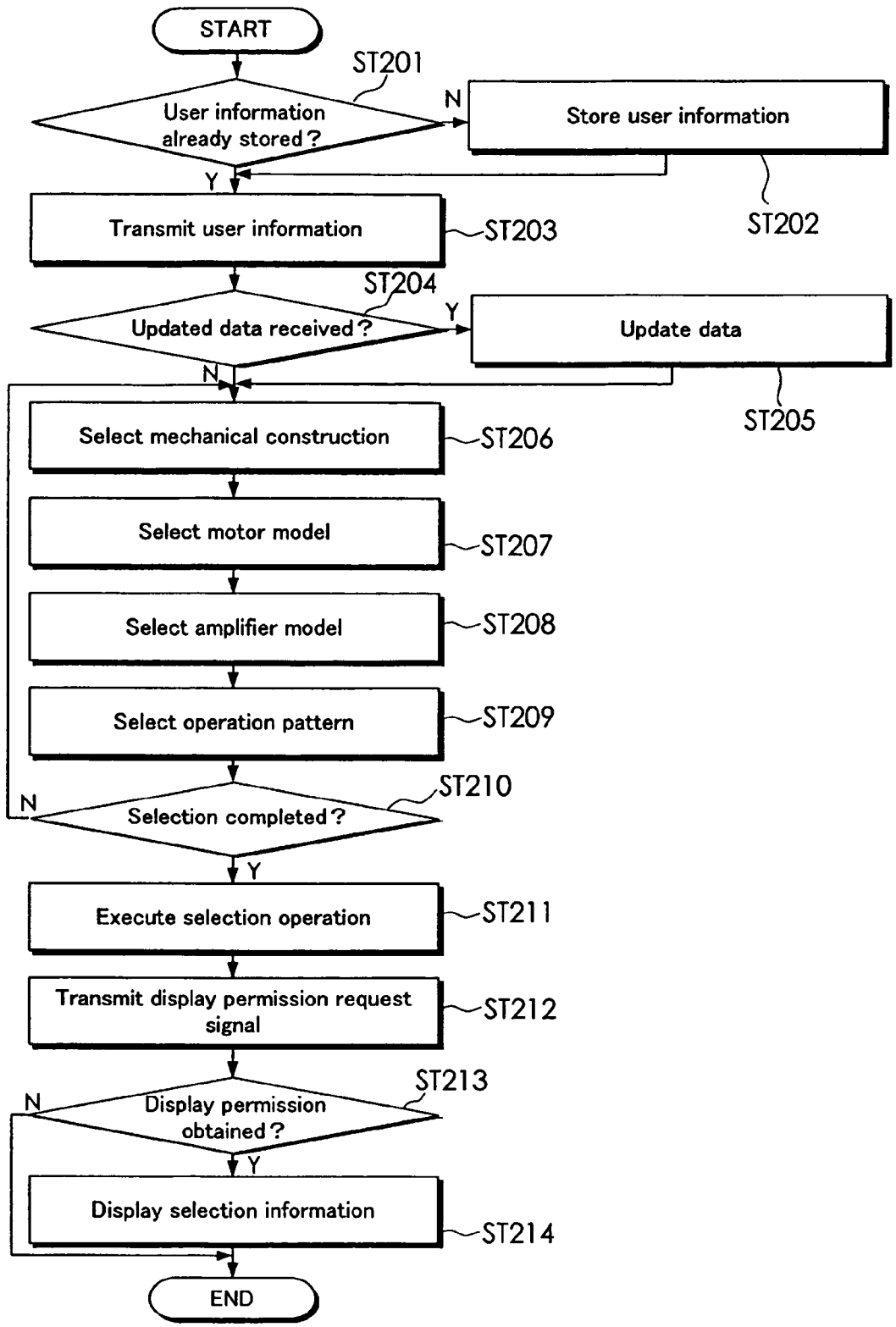
FIG. 10 is a flowchart showing a software algorithm to be used in implementing the present invention, being installed on a user terminal device in the embodiment of FIG. 9.
Figure 11:
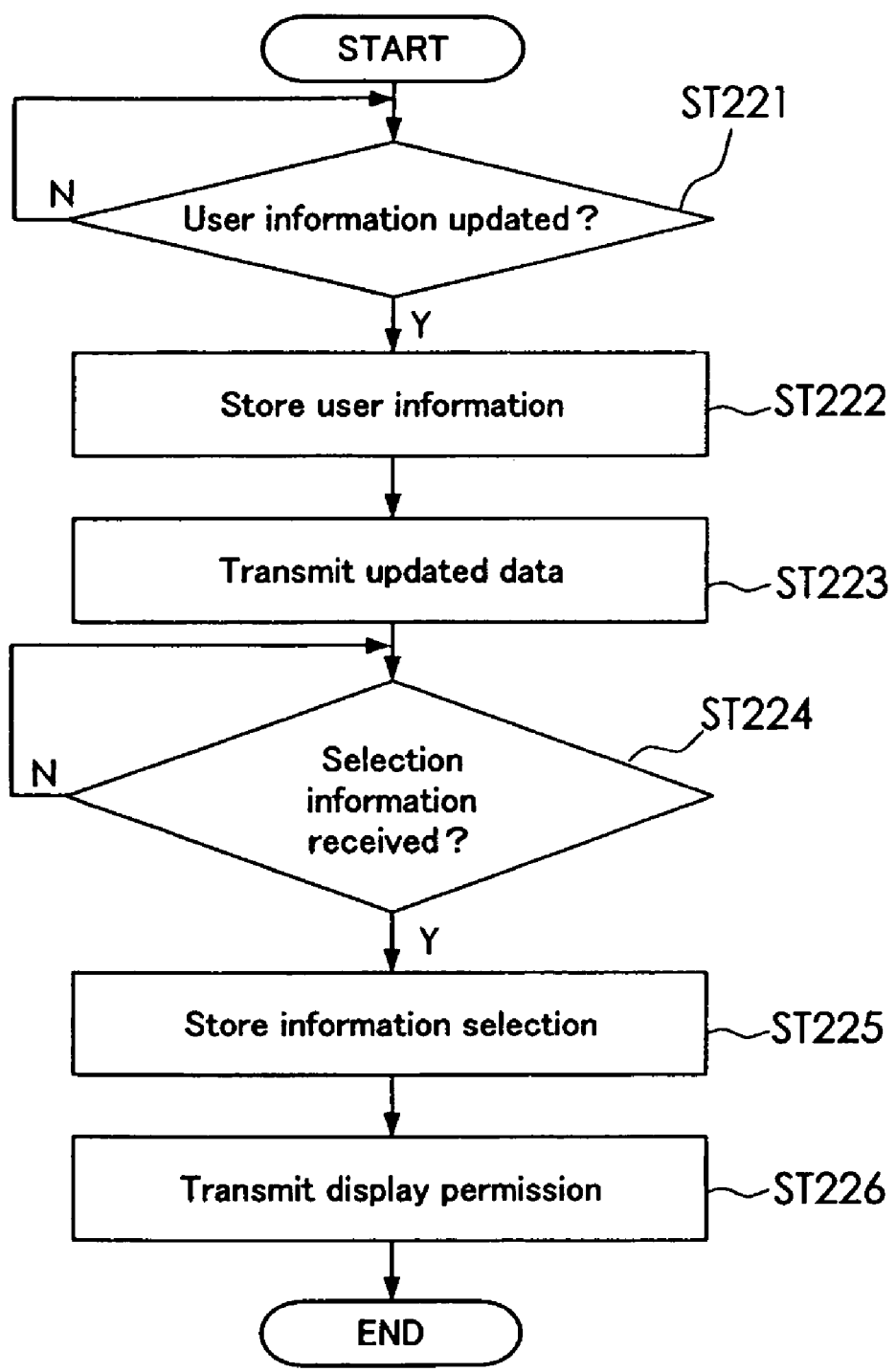
FIG. 11 is a flowchart showing a software algorithm to be used in implementing the present invention, being installed on a host computer in the embodiment of FIG. 9.
Figure 2:
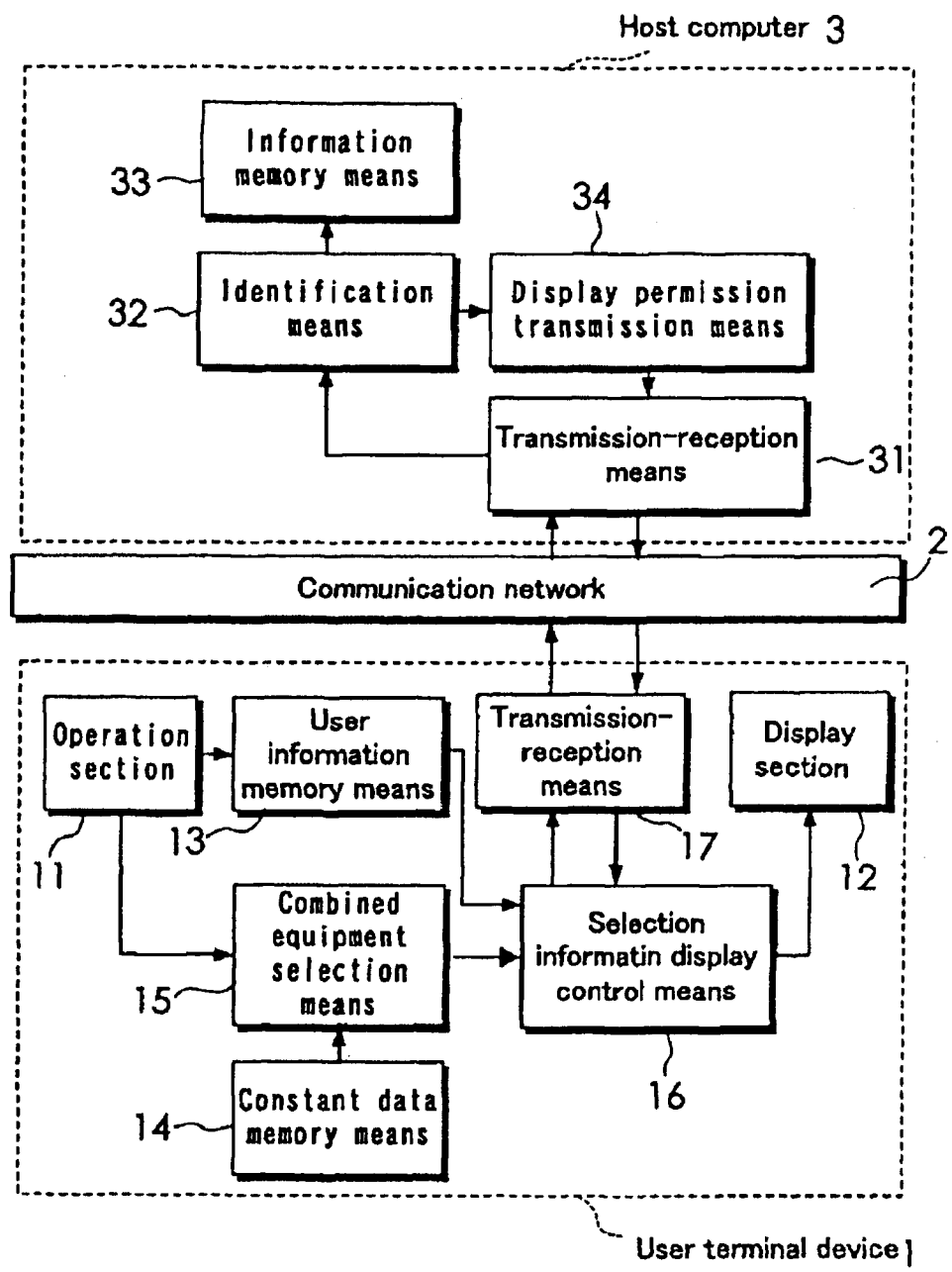

FIG. 9 is a block diagram showing still another embodiment of the present invention wherein variable data are obtained in advance. Out of the elements composing the embodiment of FIG. 9, reference numerals, obtained by adding 100 to the reference numerals in FIG. 6, are given to the elements which are the same as those in FIG. 6. The embodiment of FIG. 9 is different from that of FIG. 6 in that the an update means 219 is provided for updating the data stored in the variable data memory means 218 upon receipt of variable data from the host computer 203 on condition that the user information is transmitted to the host computer 203 in advance. FIG. 10 is a flowchart showing a software (program) algorithm to be used in implementing the present invention, being installed on a user terminal device 201 in the embodiment of FIG. 9. FIG. 11 is a flowchart showing a software (program) algorithm to be used in implementing the present invention, being installed on a host computer 203 in this embodiment.

Each of the user terminal devices includes a constant data memory means 214, a variable data memory means 218, an update means 219, a combined equipment selection means 215, and a selection information display control means 216. The update means 219 receives the variable data from the host computer 203 on condition that the user information is transmitted to the host computer 203, and updates the variable data stored in the variable data memory means 218 (at Steps ST204 and ST205). The combined equipment selection means 215 carries out a selection operation which selects one or more other combined equipment which is different from the service equipment and is suitable for being combined with the service equipment, based on model information and operational conditions of the service equipment entered from the operation section 211, the constant data stored in the constant data memory means 214, and the variable data which has previously updated by the update means 219 and is stored in the variable data memory means 218 (at Step ST211). The selection information display control means 216 requests a display permission from the host computer 203 for displaying the selection information onto the display section 212 on condition that the selection information selected by the combined equipment selection means 215 is transmitted to the host computer 203 (at Step ST212), and displays the selection information onto the display section 212 (at Step ST214) when the display permission is obtained from the host computer 203 (at Step ST213).

The host computer 203 uses the identification means 232 to identify updation of the user information when only the user information is entered from the user terminal device 201 (at Step ST221), and transmits the variable data to the user terminal device 201 via the display permission transmission means 234 and transmission-reception means 231 (at Step ST223). Then, when the identification means 232 identifies the selection information entered from the user terminal device 201 (at Step ST224), and the display permission transmission means 234 transmits a display permission to the user terminal device 201 (at Step ST226).

As with the embodiments shown in FIGS. 6 and 9, enabling updation of the variable data, in turn, enables selection of the equipment based on the recent data at any time, thereby maintaining the selection accuracy at a high level.

In any of the embodiments described above, the user may be registered at the beginning. With this arrangement, the user information, which is transmitted subsequently from the initial user registration, can be simplified into a level of ID information.

INDUSTRIAL APPLICABILITY

According to the present invention, the selection operation can be executed on the user terminal device. Therefore, even when the number of users increases, the load on the host computer side will not become extremely heavy. In addition, there is another advantage that the time until the operation result is obtained will not be prolonged. In the present invention, a display permission must be obtained by transmitting the user information and selection information to the host computer, in order to enable the selection information to be displayed onto the display section of the user terminal device. Consequently, each time the user displays the selection information on the display section, the system can securely obtain the information from the user.

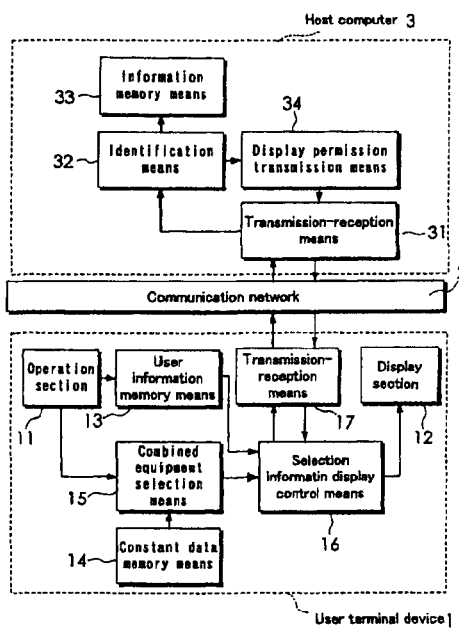

The invention claimed is:

1. A combined equipment selection system comprising:
a plurality of user terminal devices each having an operation section and a display section and connected to a communication network and
a host computer connected to said communication network for communicating with said plurality of user terminal devices and obtaining user information from said user terminal devices,
said combined equipment selection system receiving service equipment information on a service equipment which a user wishes to use, entered by said user from said operation section of said user terminal device, selecting one or more other combined equipment which is different from said service equipment and is suitable for being combined with said service equipment based on said service equipment information, and displaying selection information on said combined equipment onto said display section of said user terminal device after receiving a display permission from said host computer,
wherein each of said plurality of user terminal devices includes:
a means for storing said user information entered from said operation section,
a means for storing constant data on said service equipment and said one or more other combined equipment,
a means for storing variable data out of data necessary for selecting said combined equipment, transmitted from said host computer via said communication network,
a means for receiving said variable data from said host computer on condition that said user information is transmitted to said host computer, and updating said variable data which has been stored
a means for carrying out a selection operation which selects as said selection information one or more other combined equipment which is different from said service equipment and is suitable for being combined with said service equipment, based on model information and operational conditions of said service equipment entered from said operation section, whereby said constant data and said variable data are stored, and
a means for requesting the display permission from said host computer for displaying said selection information selected by said means for carrying out the selection operation onto said display section after said user information and said selection information is transmitted to said host computer, and displaying said selection information onto said display section when said display permission is obtained from said host computer, and
wherein said host computer includes:
a means for storing said user information obtained from said user terminal device and said selection information,
a means for identifying an input from said user terminal device, and
a means for transmitting updated said variable data to said user terminal device when said means for identifying said input from said user terminal device identifies that only said user information is entered from said user terminal device, or transmitting said display permission to said user terminal device when said means for identifying said input from said user terminal device identifies that said selection information is entered from said user terminal device.

2. A combined equipment selection system comprising:
a plurality of user terminal devices each having an operation section and a display section and connected to a communication network and
a host computer connected to said communication network for communicating with said plurality of user terminal devices and obtaining user information from said user terminal devices,
said combined equipment selection system receiving service equipment information on a service equipment which a user wishes to use, entered by said user from said operation section of said user terminal device, selecting one or more other combined equipment which is different from said service equipment and is suitable for being combined with said service equipment based on said service equipment information, and displaying selection information on said combined equipment onto said display section of said user terminal device after a display permission is received from said host computer,
wherein each of said plurality of user terminal devices is so constructed as to perform:
a function for storing said user information entered from said operation section,
a function for storing constant data on said service equipment and said one or more other combined equipment, a function for storing variable data out of data necessary for selecting said combined equipment, transmitted from said host computer via said communication network, a function for receiving said variable data from said host computer on condition that said user information is transmitted to said host computer, and updating said variable data, a function for carrying out a selection operation which selects as said selection information one or more other combined equipment which is different from said service equipment and is suitable for being combined with said service equipment, based on model information and operational conditions of said service equipment entered from said operation section, said constant data and said variable data, and a function for requesting the display permission from said host computer for displaying said selection information onto said display section said user information and said selection information is transmitted to said host computer, and displaying said selection information onto said display section when said display permission is obtained from said host computer, and wherein said host computer is so constructed as to perform:

a function for storing said user information and said selection information obtained from said user terminal device, and a function for transmitting updated said variable data to said user terminal device when only said user information is entered from said user terminal device, or transmitting said display permission to said user terminal device when said selection information is entered from said user terminal device.

3. A program for a combined equipment selection system stored in a memory, being executed on a plurality of user terminal devices in said combined equipment selection system which comprises said plurality of user terminal devices each having an operation section and a display section and connected to a communication network, and a host computer connected to said communication network for communicating with said plurality of user terminal devices and obtaining user information from said user terminal devices, wherein said combined equipment selection system receives service equipment information on a service equipment which a user wishes to use, entered by said user from said operation section of said user terminal device, selects one or more other combined equipment which is different from said service equipment and is suitable for being combined with said service equipment based on said service equipment information, and displays selection information on said combined equipment onto said display section of said user terminal device after a display permission is received from said host computer, said program being so constructed as to perform:

a function for storing said user information entered from said operation section, a function for storing constant data on said service equipment and said one or more other combined equipment, a function for storing variable data out of data necessary for selecting said combined equipment, transmitted from said host computer via said communication network, a function for receiving said variable data from said host computer on condition that said user information is transmitted to said host computer, and updating said variable data, a function for carrying out a selection operation which selects as said selection information one or more other combined equipment which is different from said service equipment and is suitable for being combined with said service equipment, based on model information and operational conditions of said service equipment entered from said operation section, said constant data, and said variable data, and a function for requesting the display permission from said host computer for displaying said selection information onto said display section after said user information and said selection information is transmitted to said host computer, and displaying said selection information onto said display section when said display permission is obtained from said host computer.

* * * * *

UNITED STATES PATENT AND TRADEMARK OFFICE
CERTIFICATE OF CORRECTION

| | |
|---|---|
| PATENT NO. | : 7,702,722 B2 |
| APPLICATION NO. | : 10/529160 |
| DATED | : April 20, 2010 |
| INVENTOR(S) | : Kanayama et al. |

It is certified that error appears in the above-identified patent and that said Letters Patent is hereby corrected as shown below:

The title page showing the illustrative figure should be deleted to be replaced with the attached title page.

On Page 2, item (56), under "OTHER PUBLICATIONS", in Column 2, Line 4, delete "providors." and insert -- providers. --.

On Page 2, item (56), under "OTHER PUBLICATIONS", in Column 2, Line 6, delete "Internati Onal" and insert -- International --.

The drawing sheet, consisting of Fig. 2, should be deleted to be replaced with the drawing sheet, consisting of Fig. 2, as shown on the attached page.

Signed and Sealed this

Twenty-seventh Day of July, 2010

David J. Kappos
*Director of the United States Patent and Trademark Office*

CERTIFICATE OF CORRECTION (continued)

(12) United States Patent
Kanayama et al.

(10) Patent No.: US 7,702,722 B2
(45) Date of Patent: Apr. 20, 2010

(54) COMBINATION EQUIPMENT SELECTION SYSTEM USING NETWORK

(75) Inventors: Masatoshi Kanayama, Nagano (JP); Akira Katou, Tokyo (JP); Noboru Ishizeki, Nagano (JP)

(73) Assignee: Sanyo Denki Co., Ltd., Tokyo (JP)

(*) Notice: Subject to any disclaimer, the term of this patent is extended or adjusted under 35 U.S.C. 154(b) by 228 days.

(21) Appl. No.: 10/529,160

(22) PCT Filed: Sep. 24, 2002

(86) PCT No.: PCT/JP02/09761

§ 371 (c)(1),
(2), (4) Date: Apr. 28, 2005

(87) PCT Pub. No.: WO2004/029845

PCT Pub. Date: Apr. 8, 2004

(65) Prior Publication Data

US 2006/0075016 A1 Apr. 6, 2006

(51) Int. Cl.
*G06F 15/16* (2006.01)
(52) U.S. Cl. ........................................... 709/203
(58) Field of Classification Search ............... 709/203, 709/218, 219; 715/700; 705/26, 27
See application file for complete search history.

(56) References Cited

U.S. PATENT DOCUMENTS 5,825,651 A * 10/1998 Gupta et al. ............... 700/103
6,032,150 A 2/2000 Nguyen
7,111,019 B1 * 9/2006 Nishizawa et al. .......... 707/201
2001/0051893 A1 12/2001 Hannai et al. ............... 705/26

(Continued)

FOREIGN PATENT DOCUMENTS

EP 1 071 017 1/2001

(Continued)

OTHER PUBLICATIONS

"The "Healthy Client" ; new client/server computing technology revolutionizing the management of information-driven systems", Savino S. P. et al., Engineering and Technology Management, Oct. 11, 1998, pp. 100-105, (English text).

(Continued)

*Primary Examiner*—Saleh Najjar
*Assistant Examiner*—Jason Recek
(74) *Attorney, Agent, or Firm*—Rankin, Hill & Clark LLP

(57) ABSTRACT

A user terminal device stores user information in a memory, and stores constant data in another memory. The user terminal device selects one or more other equipment to be combined suitably for use with the service equipment, based on the model information and operational conditions of the service equipment as well as the stored constant data. Then, the user terminal device transmits the user information and the selection information to the host computer, and requests display permission from the host computer for displaying the selection information onto the display section. The selection information is displayed on the display section only when the display permission is obtained from the host computer. Thus, workload on the host computer end may be reduced. In addition, the host computer does not fail to obtain the user information.

3 Claims, 11 Drawing Sheets